Patented Oct. 11, 1932

1,882,263

UNITED STATES PATENT OFFICE

KARL THIESS, OF FRANKFORT-ON-THE-MAIN-SINDLINGEN, AND FRITZ MÄNNCHEN, OF FRANKFORT-ON-THE-MAIN-HOCHST, GERMANY, ASSIGNORS TO GENERAL ANILINE WORKS, INC., OF NEW YORK, N. Y., A CORPORATION OF DELAWARE

SULPHUR CONTAINING VAT DYESTUFFS AND PROCESS OF MAKING THEM

No Drawing. Application filed January 8, 1930, Serial No. 419,450, and in Germany January 31, 1929.

The present invention relates to sulphur containing vat dyestuffs and a process of preparing them.

We have found that very valuable and fast dyestuffs of great tinctorial power and various tints are obtainable by transforming 2.5-diarylamino-3-mercapto-1.4-benzoquinones into the corresponding thiazine derivatives by subjecting them to an oxidation process. When using 2.5-dianilido-3-mercapto-1.4-benzoquinone, for instance, the reaction takes the following course:

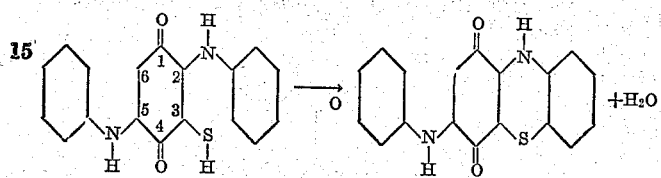 +H₂O

The mercapto compounds to be used as starting materials are obtainable, for instance, by causing a 3-halogen-2.5-diarylamino-1.4-benzoquinone to react with sodium sulphide in the presence of a diluent.

The oxidation of the mercapto compounds can be carried out by means of various oxidizing agents such, for instance, as air, nitrobenzene, sulphur or the like, it being not necessary in many cases to isolate the mercapto compounds.

The following examples serve to illustrate the invention, but they are not intended to limit it thereto, the parts being by weight:

(1) A mixture of 15 parts of 2.5-dianilido-3-mercapto-1.4-benzoquinone of the following formula:

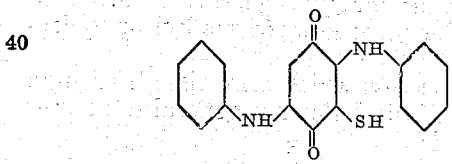

and 150 parts of nitrobenzene is slowly heated during one hour up to the boiling point and boiling is continued for 15 minutes.

On cooling the mixture, the dyestuff crystallizes out; it is filtered and washed with alcohol and water. It has a brilliant brown color, dissolves in concentrated sulphuric acid to a bluish-red solution and dyes wool from a light yellow vat intense brown shades. It has the following formula:

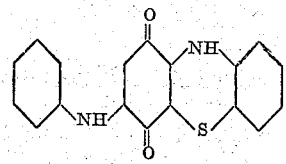

2.5-dianilido-3-mercapto-1.4-benzoquinone, used as starting material, is a greenish-yellow body which dissolves in concentrated sulphuric acid to a reddish violet solution. It is prepared by treating 3.6-dianilido-2-chloro-1.4-benzoquinone with sodium sulphide in an aqueous alcoholic solution and precipitating the product by means of dilute aqueous hydrochloric acid.

(2) 15 parts of crystallized sodium sulphide dissolved in 15 parts of water are run into a mixture of 18 parts of 2.5-di-β-naphthylamino-3-chloro-1.4-benzoquinone of the formula:

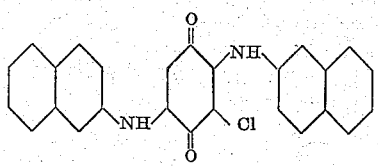

(prepared from 2.6-dichloro quinone and β-naphthylamine) and 300 parts of alcohol, the whole is boiled for 5 minutes and a concentrated, aqueous solution of 15 parts of sodium sulphide (crystallized) and 5 parts of sulphur is added. After having boiled the mixture for 3 hours, the dyestuff thus obtained is filtered, washed with alcohol and water. The violet-brown dyestuff which has the following formula:

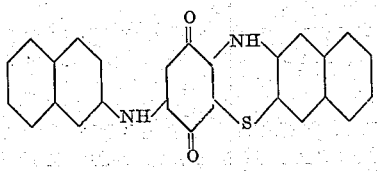

dissolves in concentrated sulphuric acid to a bluish violet solution and dyes wool from a light-yellow vat violet brown shades.

(3) 20 parts 2.5-di-4'-chloroanilido-3-chloro-6-methyl-1.4-benzoquinone of the following formula:

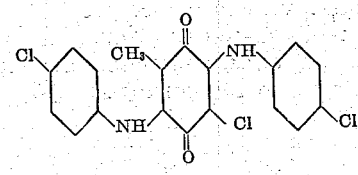

(prepared from 2.3.5-trichloro-6-methyl-1.4-benzoquinone and para-chloroaniline) are suspended in 300 parts of alcohol, the mixture is heated to boiling and a solution of 20 parts of sodium sulphide (crystallized) in 20 parts of water is added. After 5 minutes the hot solution is filtered into dilute hydrochloric acid, the mercaptan which has precipitated is filtered and washed with water. The mercaptan which is a brownish yellow body and dissolves in concentrated sulphuric acid to a blue solution is dissolved in 300 parts of alcohol and subsequently heated to boiling. Air is introduced until no more dyestuff precipitates. The dyestuff is finally filtered and washed with alcohol and water. It has the following formula:

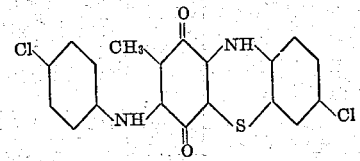

and is an olive-brown body which dissolves in concentrated sulphuric acid to a violet solution and dyes wool from a light yellow vat olive brown shades.

We claim:

1. As a new product the dyestuff of the following formula:

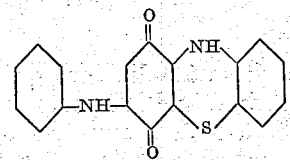

the said dyestuff forming in the dry state brown crystals which dissolve in concentrated sulphuric acid to a bluish red solution dyeing wool from a light yellow vat intense brown shades.

2. As a new product, the dyestuff of the following formula:

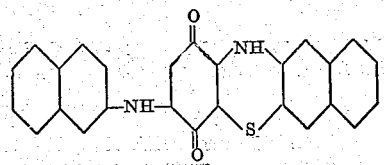

the said dyestuff being a violet-brown body dissolving in concentrated sulphuric acid to a bluish violet solution dyeing wool from a light-yellow vat violet brown shades.

3. As a new product, the dyestuff of the following formula:

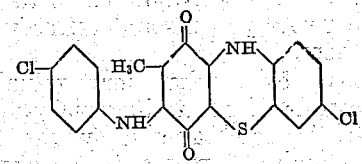

the said dyestuff being an olive-brown body dissolving in concentrated sulphuric acid to a violet solution dyeing wool from a light-yellow vat olive brown shades.

4. As new products, sulphur containing vat dyestuffs of the following general structure:

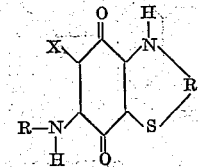

wherein R stands for a benzene or naphthalene nucleus and X for hydrogen or, in case of R being a benzene nucleus, for methyl or hydrogen.

5. As new products, sulphur containing vat dyestuffs of the following formula:

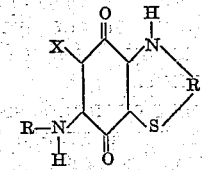

wherein R stands for a phenyl group which may contain a chlorine atom in para position to the NH-group, or a naphthyl group and X stands for hydrogen or, in case of R being a phenyl group, for methyl or hydrogen.

6. The process which comprises treating a substance of the following general structure:

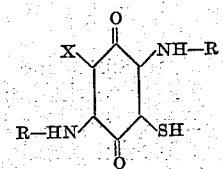

wherein R stands for a benzene or naphthalene nucleus and X for hydrogen or, in case of R being a benzene nucleus, for methyl or hydrogen with an oxidizing agent.

In testimony whereof, we affix our signatures.

KARL THIESS.
FRITZ MÄNNCHEN.